United States Patent
Heo (10) Patent No.: US 11,592,047 B2
(45) Date of Patent: Feb. 28, 2023

(54) STRAIGHTLY ASSEMBLED BLOCK THAT IS EASILY COUPLED AND RESISTANT TO WEAR

(71) Applicant: IRINGO CO., LTD., Incheon (KR)

(72) Inventor: In-Deok Heo, Incheon (KR)

(73) Assignee: IRINGO CO., LTD., Incheon (KR)

( * ) Notice: Subject to any disclaimer, the term of this patent is extended or adjusted under 35 U.S.C. 154(b) by 325 days.

(21) Appl. No.: 16/641,881

(22) PCT Filed: Sep. 7, 2018

(86) PCT No.: PCT/KR2018/010526
§ 371 (c)(1),
(2) Date: Feb. 25, 2020

(87) PCT Pub. No.: WO2019/050351
PCT Pub. Date: Mar. 14, 2019

(65) Prior Publication Data
US 2020/0191187 A1  Jun. 18, 2020

(30) Foreign Application Priority Data

Sep. 8, 2017 (KR) .................. 10-2017-0115471

(51) Int. Cl.
*A63H 33/08* (2006.01)
*F16B 7/04* (2006.01)
*A63H 33/06* (2006.01)

(52) U.S. Cl.
CPC ........... *F16B 7/042* (2013.01); *A63H 33/062* (2013.01); *A63H 33/065* (2013.01); *A63H 33/08* (2013.01)

(58) Field of Classification Search
CPC combination set(s) only.
See application file for complete search history.

(56) References Cited

U.S. PATENT DOCUMENTS 5,172,534 A   12/1992  Milner et al.
5,350,331 A *  9/1994  Glickman ............ A63H 33/062
                                          446/124

(Continued)

FOREIGN PATENT DOCUMENTS

KR   26-2000-0020440 U   12/2000
KR   10-0571064 B1        4/2006

(Continued)

*Primary Examiner* — John A Ricci
(74) *Attorney, Agent, or Firm* — Bridgeway IP Law Group, PLLC; Sang Ho Lee; Hyun Woo Shin (57) ABSTRACT

The present invention relates to a straightly assembled block comprising engaging assembly means configured in male and female types, first ends of which can be coupled to each other, such that male and female piece blocks can be assembled by connecting the same to each other straightly, and the engaging assembly means are improved such that wear is prevented in spite of repeated separation/coupling, thereby maintaining continuous assembly power. To this end, the male and female piece blocks have engaging assembly means, first ends of which protrude in arc shapes, and the second ends of which are coupled to each other. Alternatively, connecting blocks have engaging assembly means formed on both ends thereof in different types. The engaging assembly means formed on the piece blocks or on the connecting blocks comprise a recessed portion and a protruding portion. Each of the recessed portion and the protruding portion has a guide means and a coupling means provided on both coupling surfaces thereof, respectively, the coupling means being guided along the guide means so as to engage, such that the same are connected on the same straight line. An incision hole for an elastic action is formed from a corner of the recessed portion toward the interior, on which a rotating shaft is formed, such that, when the protruding portion is guided and coupled, the incision hole is elastically operated so as to widen the recessed portion in (Continued)

the leftward/rightward outward direction, thereby preventing wear of the engaging coupling means.

1 Claim, 6 Drawing Sheets

(56) References Cited

U.S. PATENT DOCUMENTS

| | | | | |
|---|---|---|---|---|
| 6,948,998 | B2* | 9/2005 | Bagley | A63H 33/062 |
| | | | | 446/124 |
| 8,939,674 | B2* | 1/2015 | Zimmer | B29C 66/12445 |
| | | | | 403/14 |
| 10,478,741 | B2* | 11/2019 | Heo | A63H 33/062 |
| 11,020,683 | B2* | 6/2021 | Fang | A63H 33/086 |
| 11,278,821 | B2* | 3/2022 | Brain | A63H 33/062 |
| 2010/0330867 | A1* | 12/2010 | Fogel | A63H 33/062 |
| | | | | 446/124 |

FOREIGN PATENT DOCUMENTS

| | | | |
|---|---|---|---|
| KR | 10-2008-0019360 | A | 3/2008 |
| KR | 10-0867340 | B1 | 11/2008 |
| KR | 10-1222022 | B1 | 1/2013 |
| KR | 10-2014-0025078 | A | 3/2014 |
| KR | 10-1443254 | B1 | 9/2014 |

* cited by examiner

STRAIGHTLY ASSEMBLED BLOCK THAT IS EASILY COUPLED AND RESISTANT TO WEAR

TECHNICAL FIELD

The present invention relates to a straightly assembled block provided at one end thereof with an engaging assembly device configured in male and female types that may be coupled to each other so that male and female piece blocks may be assembled with each other by connecting the male and female piece blocks to each other in a straight line, and more particularly, to a straightly assembled block in which an engaging assembly device is improved so that wear of an engaging coupling device, which is configured to prevent coupled piece blocks from being separated, is prevented in spite of repeated separation/coupling, thereby continuously maintaining an assembled state.

BACKGROUND ART

A conventional straightly assembled block is assembled in the form of a chain, in which male and female piece blocks are connected to each other, or a connecting block is connected between the male and female piece blocks, so that the straightly assembled block may be assembled in various lengths or shapes according to an assembly shape.

Patent Registration No. 10-0887340 disclosing a straightly assembled block having a length that may vary has been filed by the applicant, and the straightly assembled block has an assembly structure in which an engaging assembly device provided on each of male and female piece blocks includes a protruding surface and an inner surface having bottom surfaces, and the male and female piece blocks are coupled and assembled from upper and lower sides such that the bottom surface of the protruding surface and the bottom surface of the inner surface are engaged with each other.

However, the conventional straightly assembled block has a disadvantage in that a coupling portion is easily dislocated so that assembly is not easy when positions of the protruding surface and the inner surface of the piece block do not exactly match.

Therefore, in order to improve the above problem, according to another Patent Registration No. 10-1222022 of the applicant, piece blocks may be connected to each other in the same straight line.

To this end, an engaging assembly device of a piece block includes a recessed portion and a protruding portion so that male and female piece blocks may be coupled to each other in the same straight line on both sides, each of the recessed portion and the protruding portion is provided on both coupling surfaces thereof with a guide device and a coupling device guided along the guide device so as to be engaged, and an engaging coupling device is provided in each of the guide device and the coupling device to prevent arbitrary separation in an assembled state.

However, the problem of the above configuration is that the engaging coupling device for preventing the arbitrary separation wears out due to repeated assembly/coupling where the protruding portion is guided to the recessed portion, causing the assembly to become loose.

In other words, as the protruding portion is guided to the recessed portion, when the coupling device provided on the protruding portion is forcibly pressed to the coupling device provided on the recessed portion while being latched at an entry portion of the recessed portion, the coupling device provided on the protruding portion enters the entry portion so as to be latched. In this case, since the coupling devices are assembled with each other by the forcible pressing, the coupling device wears out, so that the coupling strength is reduced.

Meanwhile, according to another Patent Registration No. 10-1443254 of the applicant, a structure of a piece block is configured such that a vertical rod of a female coupling portion is provided at both lower ends of a male coupling portion so as to be orthogonal to the male coupling portion, and an opening is formed in a connecting portion of the male coupling portion and the female coupling portion, so that the vertical rod is elastically operated so as to be flexibly widened outward, thereby minimizing wear when coupling the male coupling portion to the female coupling portion.

However, according to the above piece block, for the elastic operation to widen the vertical rod of the female coupling portion, since a reference point of the elastic operation is shifted while the vertical rod is orthogonal to both lower sides of the male coupling portion such that the reference point of the elastic operation is formed at the connecting portion, such an elastic widening operation may be performed, and since a contact area of the vertical rod is wide, the connecting portion serves as a lever for the elastic operation.

On the contrary, since the piece block of the straightly assembled block has the recessed portion coupled with the protruding portion provided on another piece block or another connecting block and inserted into the piece block, the above elastic operation is impossible.

Therefore, the assembly of the straightly assembled block becomes loose due to the wear incurred by the repeated assembly, so that consumers have been demanding to improve such problems.

DISCLOSURE

Technical Problem

Therefore, to solve the problems described above, an object of the present invention is to improve an engaging assembly device so that a protruding portion may be guided to aw recessed portion so as to be easily coupled, and to allow the recessed portion to have an elastic force so that wear of an engaging coupling device for preventing separation may be minimized, thereby maintaining coupling strength even after repeated use for a long time.

Technical Solution

To achieve the objects described above, according to the present invention, there is provided a straightly assembled block that is easily coupled and resistant to wear, in which the straightly assembled block includes male and female piece blocks having one end protruding in an arc shape and provided with a rotating shaft so as to be rotatable and an opposite end provided with engaging assembly devices coupled to each other, or a connecting block having both ends provided with different types of engaging assembly devices, the engaging assembly device includes a recessed portion and a protruding portion, and each of the recessed portion and the protruding portion is provided on both coupling surfaces thereof with a guide device, a coupling device guided along the guide device so as to be engaged, so that the recessed portion and the protruding portion are connected to each other in a same straight line, wherein an incision hole for an elastic action is formed from a corner of the recessed portion toward an interior on which the rotating shaft is provided, such that when the protruding portion is guided and coupled, the recessed portion is elastically operated so as to be widened in a left/right outward direction, thereby preventing wear of the engaging coupling device.

Advantageous Effects

Therefore, according to the present invention, the male and female piece blocks or the connecting block is easily assembled or disassembled with a guide structure while being elastically widened to allow the engaging coupling device for preventing the arbitrary separation to be prevented from being worn out even after repeated use, so that durability of the assembled block can be improved, thereby resolving consumer's complaints and providing high merchantability.

BEST MODE

The best mode for carrying out the present invention is a straightly assembled block that is easily coupled and resistant to wear, in which the straightly assembled block includes male and female piece blocks 100 and 110 having one end protruding in an arc shape and provided with rotating shafts 100a, 110a, and 120a so as to be rotatable, and an opposite end provided with engaging assembly devices 140 coupled to each other, or a connecting block 120 having both ends provided with different types of engaging assembly devices 140, the engaging assembly device 140 includes a recessed portion 141 and a protruding portion 142, and each of the recessed portion 141 and the protruding portion 142 is provided on both coupling surfaces 101, 111, and 121 thereof with a guide device 150, a coupling device 160 guided along the guide device 150, and an engaging coupling device 170 for preventing arbitrary separation, so that the recessed portion 141 and the protruding portion 142 are connected to each other in a same straight line, wherein an elastic hole 180 for an elastic action is formed from a corner of the recessed portion 141 toward an interior on which the rotating shafts 100a, 110a, and 120a are provided, such that when the protruding portion 142 is guided and coupled, the recessed portion 141 is elastically operated so as to be widened in a left/right outward direction, thereby preventing wear of the engaging coupling device 170.

[Mode for Invention]

Hereinafter, the present invention will be described in detail with reference to the accompanying drawings.

Figure 1:
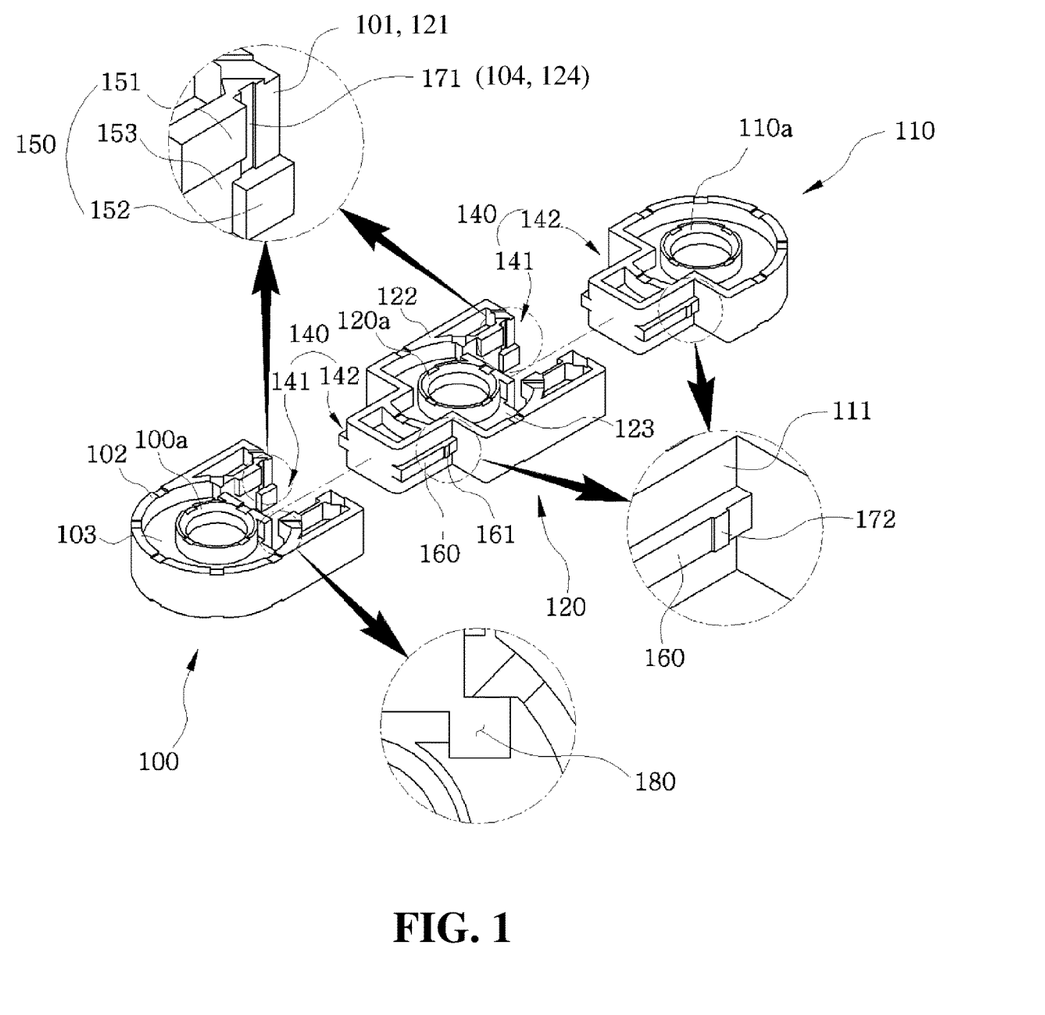
FIG. 1 is an exploded view showing a block according to one embodiment of the present invention.

As shown in FIG. 1, a straightly assembled block that is easily coupled and resistant to wear according to the present invention, which has a generally known configuration in which the straightly assembled block includes male and female piece blocks 100 and 110 having one end protruding in an arc shape and provided with rotating shafts 100a, 110a, and 120a so as to be rotatable, and an opposite end provided with engaging assembly devices 140 coupled to each other, or a connecting block 120 having both ends provided with different types of engaging assembly devices 140, the engaging assembly device 140 includes a recessed portion 141 and a protruding portion 142, and each of the recessed portion 141 and the protruding portion 142 is provided on both coupling surfaces 101, 111, and 121 thereof with a guide device 150 and a coupling device 160 guided along the guide device 150 so as to be engaged, so that the recessed portion 141 and the protruding portion 142 are connected to each other in a same straight line, wherein an elastic hole 180 for an elastic action is formed from a corner of the recessed portion 141 toward an interior on which the rotating shafts 100a, 110a, and 120a are provided, such that the recessed portion 141 is elastically operated so as to be widened in a left/right outward direction upon coupling, thereby preventing wear of the engaging coupling device 160.

In this case, the recessed portion 141 is formed only on the female piece block 100 and one side of the connecting block 120, and the protruding portion 142 is formed on the male piece block 110 and an opposite side of the connecting block 120 where the recessed portion 141 is not formed.

In addition, the guide device 150 is formed in the recessed portions 141 of the female piece block 100 and the connecting block 120, and provided in the form of a straight-line rail 153 formed on the same horizontal plane extending in a forward-rearward direction of the coupling surfaces 101 and 121 of the recessed portion 141, wherein protruding sills 151 and 152 are provided on upper and lower sides of the coupling surfaces 101 and 121, so that the rail 153 is provided in a space formed in the middle of upper and lower protruding sills 151 and 152.

However, the present invention is not limited to the above structure of the rail 153, and although not shown in the drawings, the rail 153 may be provided in the coupling surfaces 101 and 121 in the form of a slide groove, while the rail 153 preferably has a rail structure including a protruding sill because of a structure for mold separation of injection molding.

In addition, the coupling device 160 guided by the rail 153 of the guide device 150 has a protruding frame 161 provided on the coupling surfaces 111 and 121 of the protruding portions 142 of the male coupling block 110 and the connecting block 120, wherein the protruding frame 161 of the coupling device 160 is guided and introduced by the rail 153 of the guide device 150, so that the blocks are stably and easily assembled without being deviated.

In this case, the male and female piece blocks 100 and 110 and the connecting block 120 have border walls 102, 112, and 122 and inner depressed surfaces 103, 113, and 123, which are depressed inward than the border walls 102, 112, and 122 by performing a coring process with respect to top and bottom surfaces thereof to have a wall thickness equal to a wall thickness of the border walls 102, 112, and 122, and the inner depressed surfaces 103, 113, and 123 have the elastic hole 180 formed in a portion connected to the corner of the recessed portion 141 by a cutting process so that the recessed portion 141 may perform the elastic action.

Figure 3:
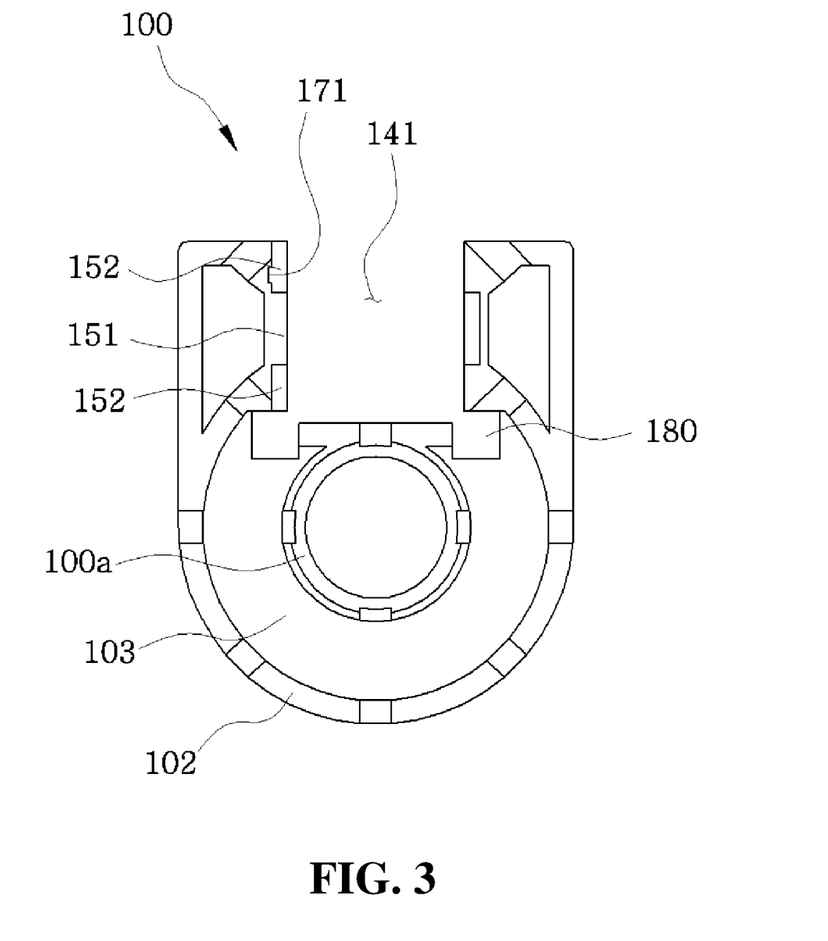
FIG. 3 is a plan view showing an elastic hole of the block according to one embodiment of the present invention.
Figure 5:
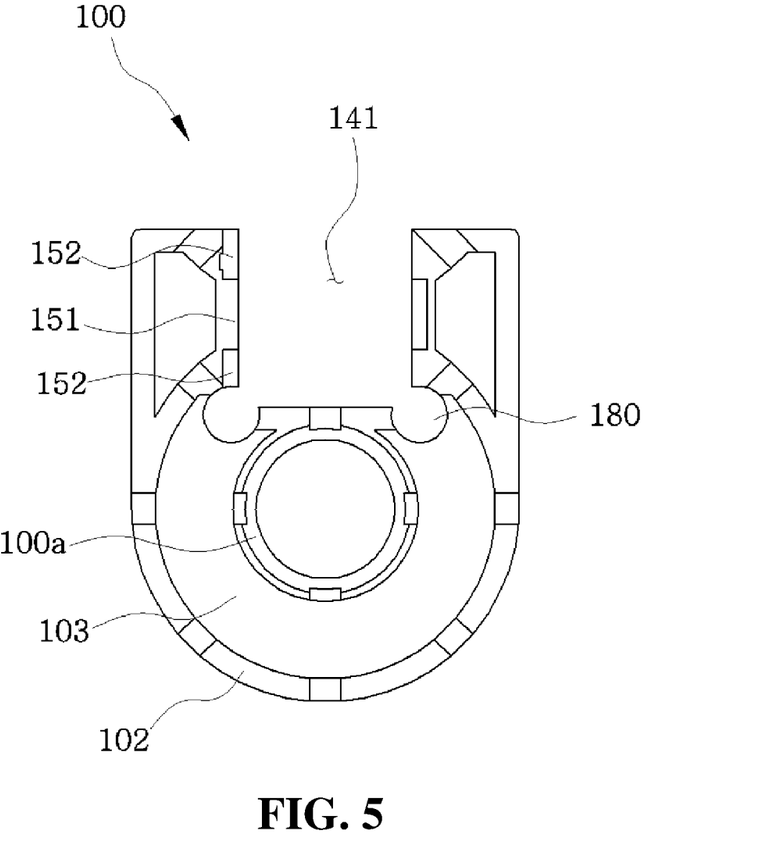
FIG. 5 is a plan view showing an elastic hole of a block according to another embodiment of the present invention.

In other words, due to the elastic hole 180 formed on an inner side of a connecting portion of the border wall that forms the recessed portion 141 and the inner depressed surface, a connection width of the connecting portion is narrowed, so that the elastic action may be performed.

In more detail, one side of the elastic hole 180 is connected to the corner of the recessed portion 141 so as to form an opening, so that the elastic action may be performed while maintaining a structure for coupling the recessed portion 141.

In this case, the elastic hole 180 may have a rectangular or circular shape so that the elastic hole 180 may be flexibly widened due to an elastic force.

Figure 4:
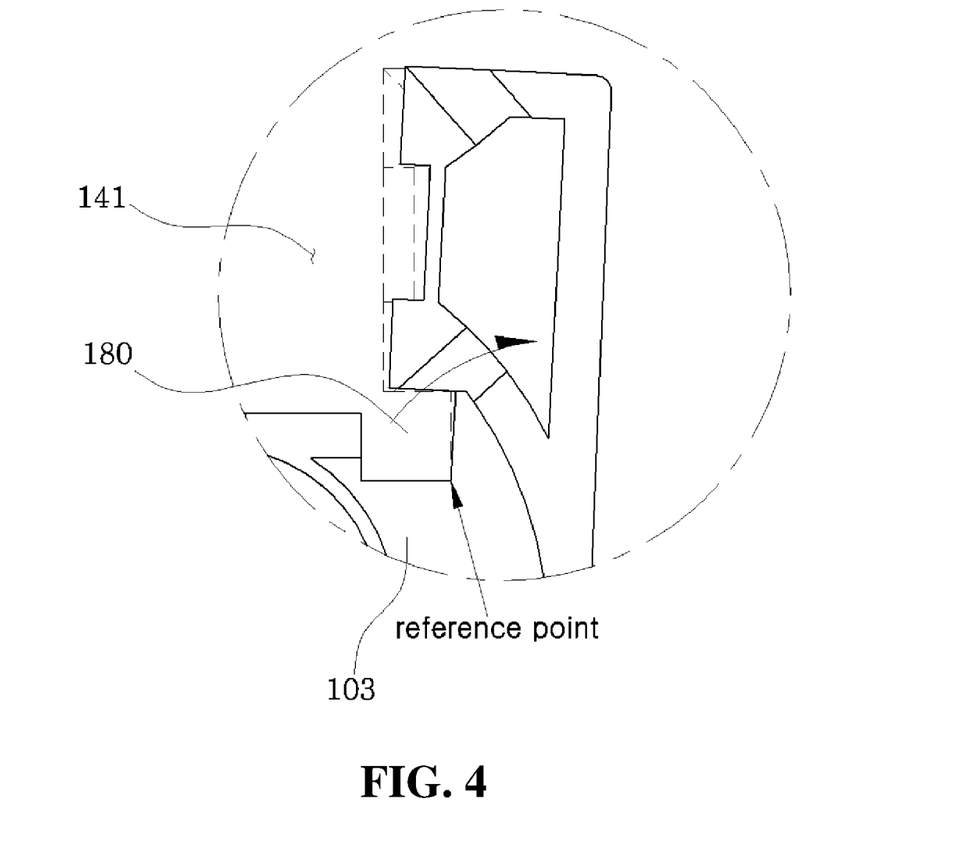
FIG. 4 is a schematic view showing an elastic action state of the elastic hole of FIG. 3.

In other words, when the elastic hole 180 has a rectangular shape, the elastic hole 180 serves as a center for elastic widening that occurs at an outer corner of the elastic hole 180 where horizontal and vertical sides orthogonally meet each other, so that the elastic hole 180 is easily widened due to elasticity.

Figure 6:
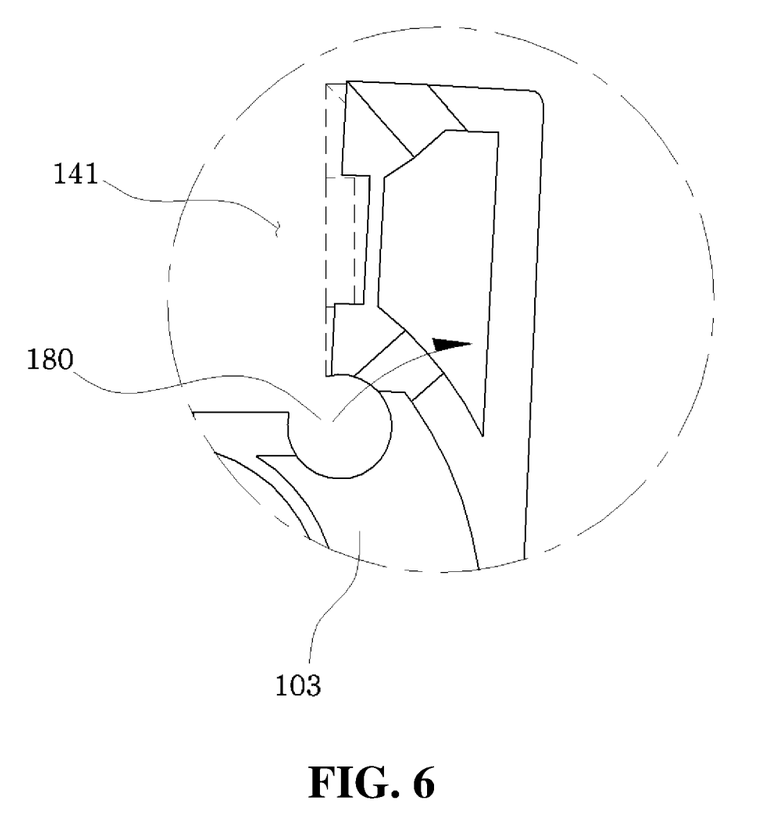
FIG. 6 is a schematic view showing an elastic action state of the elastic hole of FIG. 5.

In addition, when the elastic hole 180 has a circular shape, the elastic hole 180 is configured to have a shock-absorbing function so as to further enhance the elastic action of the recessed portion.

In this case, the engaging coupling device 170 configured so as not to be arbitrarily separated when the blocks are assembled has latching grooves 104 and 124 formed in coupling surfaces 101 and 121 on which the guide devices 150 of the recessed portions 141 of the female piece block 100 and the connecting block 120 are provided, and a latching sill 161 latched to the latching grooves 104 and 124 and provided on side surfaces of the coupling devices 160 of the protruding portions 142 which are provided on the male piece block 110 and the connecting block 120.

Figure 2:
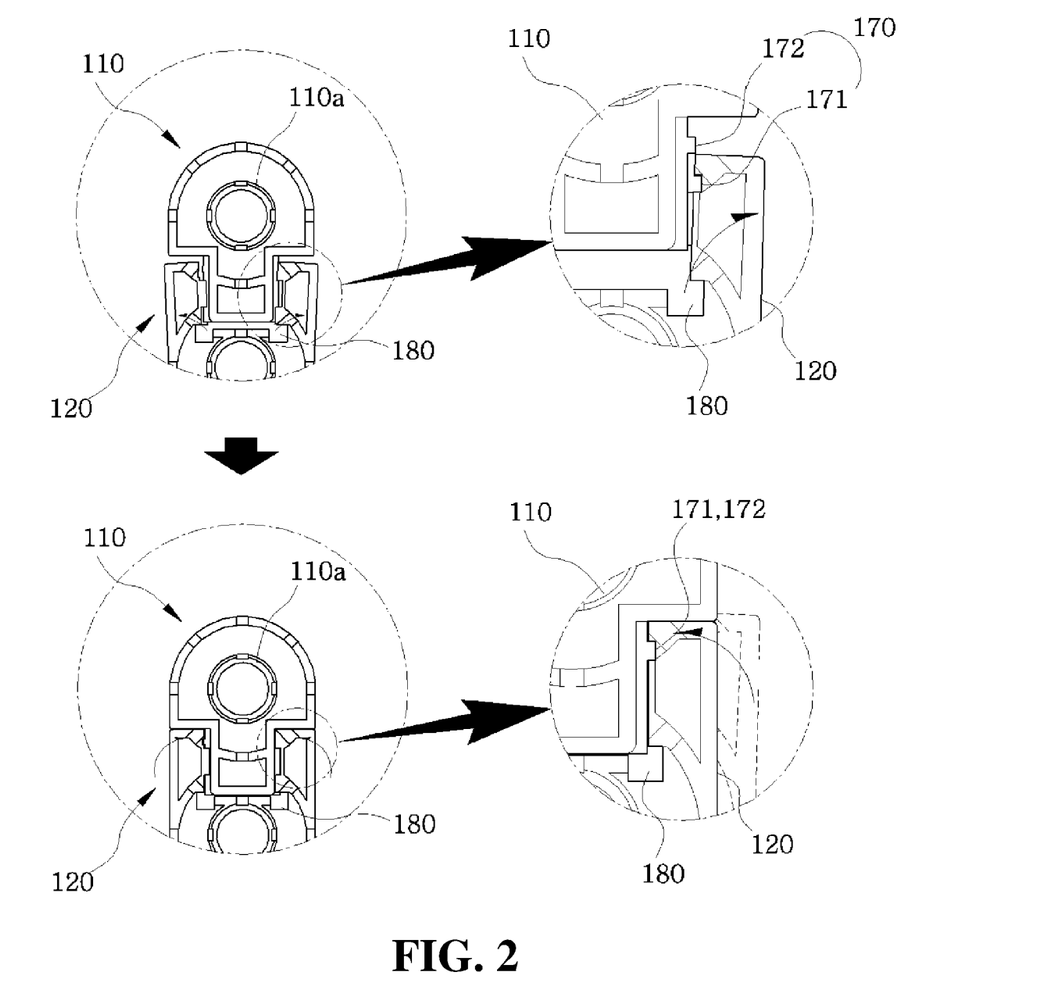
FIG. 2 is a view showing steps of assembling the block of the present invention.

Therefore, the blocks are coupled to each other regardless of an assembly direction, and when the protruding portion of the recessed portion 141 is assembled, if the latching sill 161 provided on the protruding portion 142 is pressed while being latched to a front end of the recessed portion 141, the recessed portion 141 is momentarily widened by the elastic force, the protruding portion 142 fully enters the recessed portion 141, the latching 161 is latched to the latching grooves 104 and 124, and the recessed portion 141 is restored in a latched state, so that a coupling process is performed in a rigid latching structure.

The invention claimed is:

1. A linearly assembled block comprising:
   a male piece block and a female piece block, each of the male piece block and the female piece block having one end protruding in an arc shape and provided with rotating shafts so as to be rotatable, and an opposite end provided with a male engaging assembly device or a female engaging assembly device, respectively, configured to couple to each other or to a connecting block,
   wherein the each of the male and female piece blocks include an inner depressed surface depressed by a border wall protruding from top and bottom surfaces of a border; and
   the connecting block having a first end and a second end, wherein the first end has a male engaging assembly device configured to couple to the female engaging assembly device of the female piece block and the second end has a female engaging assembly device configured to couple to the male engaging assembly device of the male piece block,
   wherein the female engaging assembly device includes a recessed portion, the male engaging assembly device includes a protruding portion, and each of the recessed portion and the protruding portion is provided on a coupling surface thereof with a guide device and a coupling device guided along the corresponding guide device to couple to each other when the male and female engaging assembly devices engage and couple to each other,
   wherein the recessed portion of the female engaging assembly device includes an elastic hole formed at an inner corner of the recessed portion and having a rectangular shape, and the elastic hole is open inward toward the inner depressed surface without the border wall such that the elastic hole communicates with the inner depressed surface, and a width of a connection portion between the border wall forming the recessed portion and the inner depressed surface is narrowed, and an elastic reference point is formed at a point where horizontal and vertical sides orthogonally meet each other and the elastic hole is flexibly widened due to an elastic force of the elastic hole, and
   wherein a latching groove, which is depressed inward, is formed on an outer front end of the coupling surface of the recessed portion formed with the guide device, and a latching sill protrudes outward from an inner front end of a side surface of the coupling device of the protruding portion, the coupling device of the protruding portion is guided by the guide device of the recessed portion and the elastic hole is widened due to the elastic force by pressure in a state in which a front end of the recessed portion is latched to the latching sill protruding from the side surface of the coupling device, and locking and unlocking with respect to the latching groove is performed.

* * * * *